United States Patent
Toyokawa

(10) Patent No.: US 8,940,192 B2
(45) Date of Patent: Jan. 27, 2015

(54) PROCESS FOR PRODUCING CARBON PARTICLES FOR ELECTRODE, CARBON PARTICLES FOR ELECTRODE, AND NEGATIVE-ELECTRODE MATERIAL FOR LITHIUM-ION SECONDARY BATTERY

(75) Inventor: Takuya Toyokawa, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 873 days.

(21) Appl. No.: 13/142,168

(22) PCT Filed: Dec. 25, 2009

(86) PCT No.: PCT/JP2009/071630
§ 371 (c)(1),
(2), (4) Date: Aug. 1, 2011

(87) PCT Pub. No.: WO2010/074243
PCT Pub. Date: Jul. 1, 2010

(65) Prior Publication Data
US 2011/0278506 A1    Nov. 17, 2011

(30) Foreign Application Priority Data

Dec. 26, 2008  (JP) ................. 2008-332326
Dec. 26, 2008  (JP) ................. 2008-332327
Aug. 11, 2009  (JP) ................. 2009-186727
Aug. 11, 2009  (JP) ................. 2009-186728

(51) Int. Cl.
*H01B 1/04*        (2006.01)
*C01B 31/02*       (2006.01)
(Continued)

(52) U.S. Cl.
CPC ............. *C01B 31/02* (2013.01); *H01M 4/364* (2013.01); *H01M 4/38* (2013.01); *H01M 4/587* (2013.01);
(Continued)

(58) Field of Classification Search
CPC .............. H01M 4/1395; H01M 4/134; H01M 10/0525; H01M 2004/021

USPC .......... 252/182.1, 503; 429/211, 218.1, 231.8
See application file for complete search history.

(56) References Cited

U.S. PATENT DOCUMENTS

| | | |
|---|---|---|
| 5,702,845 A | 12/1997 | Kawakami et al. |
| 2002/0164479 A1 | 11/2002 | Matsubara et al. |

(Continued)

FOREIGN PATENT DOCUMENTS

| | | |
|---|---|---|
| CN | 1742397 A | 3/2006 |
| EA | 009404 B1 | 6/2005 |

(Continued)

OTHER PUBLICATIONS

Extended European Search Report dated Jul. 31, 2013 for EP Appln No. 09835039.0.

*Primary Examiner* — Khanh Tuan Nguyen
(74) *Attorney, Agent, or Firm* — Novak Druce Connolly Bove + Quigg LLP

(57) ABSTRACT

Provided is a method of producing carbon particles for an electrode, each containing particles of a metal capable of forming an alloy with lithium, being formed by an aggregation of numerous fine particles composed of carbon, and having a hollow open-cell structure in which cells among the fine particles form a plurality of interconnected pores. The method includes mixing together a monomer having a low compatibility with a polymer to be formed, an organic solvent having a low compatibility with the polymer to be formed, and particles of a metal capable of forming an alloy with lithium, to prepare a monomer-containing mixture; dispersing the monomer-containing mixture in an aqueous phase to prepare a suspension containing, dispersed therein, oil droplets of the monomer-containing mixture; polymerizing the oil droplets in the suspension to prepare resin particles; and curing the resin particles. The carbon particles find use for negative-electrode in lithium-ion secondary batteries.

3 Claims, 2 Drawing Sheets

(51) Int. Cl.
*H01M 4/36* (2006.01)
*H01M 4/38* (2006.01)
*H01M 4/587* (2010.01)
*H01M 10/0525* (2010.01)
*H01G 11/24* (2013.01)
*H01G 11/32* (2013.01)
*H01G 11/50* (2013.01)
*H01M 4/134* (2010.01)
*H01M 4/62* (2006.01)
*H01M 4/02* (2006.01)

(52) U.S. Cl.
CPC ........... *H01M 10/0525* (2013.01); *H01G 11/24* (2013.01); *H01G 11/32* (2013.01); *H01G 11/50* (2013.01); *H01M 4/134* (2013.01); *H01M 4/625* (2013.01); *H01M 2004/021* (2013.01); *Y02E 60/13* (2013.01); *Y02E 60/122* (2013.01)
USPC ...... 252/503; 252/182.1; 429/211; 429/218.1; 429/231.8

(56) References Cited

U.S. PATENT DOCUMENTS

| | | | |
|---|---|---|---|
| 2007/0059233 A1 | 3/2007 | Sheem et al. | |
| 2007/0099084 A1 | 5/2007 | Huang et al. | |

FOREIGN PATENT DOCUMENTS

| | | | |
|---|---|---|---|
| EP | 1205989 | A2 | 5/2002 |
| JP | 2001-160392 | | 6/2001 |
| JP | 2003-187798 | | 7/2003 |
| JP | 2003-303588 | A | 10/2003 |
| JP | 2004-259475 | | 9/2004 |
| JP | 2005-123175 | | 5/2005 |
| JP | 2005-135925 | A | 5/2005 |
| JP | 2006-228640 | A | 8/2006 |
| JP | 2007-265751 | A | 10/2007 |
| JP | 2007-294196 | A | 11/2007 |
| JP | 2008-526664 | | 7/2008 |
| JP | 2008-186732 | A | 8/2008 |
| JP | 2009-176603 | A | 8/2009 |
| JP | 2009-266795 | A | 11/2009 |
| WO | WO-03/100883 | A2 | 12/2003 |
| WO | WO-2006/071076 | A1 | 7/2006 |

(a)

(b)

(c)

PROCESS FOR PRODUCING CARBON PARTICLES FOR ELECTRODE, CARBON PARTICLES FOR ELECTRODE, AND NEGATIVE-ELECTRODE MATERIAL FOR LITHIUM-ION SECONDARY BATTERY

CROSS REFERNCE TO RELATED APPLICATIONS

This application is a National Phase filing under 35 U.S.C §371 of PCT/JP2009/071630 filed on Dec. 25, 2009; and this application claims priority to Application No. 2008-332326 filed in Japan on Dec. 26, 2008 under 35 U.S.C §119, Application No. 2008-332327 filed in Japan on Dec.26, 2008 under 35 U.S.C. §119 Application No. 2009-186727 filed in Japan on Aug. 11, 2009 under 35 U.S.C §119 and Application No. 2009-186728 filed in Japan on Aug. 11, 2009 under 35 U.S.C §119; the entire contents of all are hereby incorporated by reference.

TECHNICAL FIELD

The present invention relates to a method of producing carbon particles for an electrode, the carbon particles being highly suitable for use as an electrode material, and being able to achieve a high charge/discharge efficiency and durability when used as a negative-electrode material in lithium-ion secondary batteries.

BACKGROUND ART

Carbon materials composed of carbonaceous cured bodies are used as the electrode materials in, for example, lithium-ion secondary batteries, electrical double-layer capacitors, and capacitors.

For example, a carbon material is used as the negative-electrode active material in lithium-ion secondary batteries. A "rocking chair-type" battery configuration is employed in which lithium in an ionic state is intercalated into the carbon material during charging of the battery, and is deintercalated as ions during battery discharge.

As the trend toward smaller sizes and greater functionality in electronic devices proceeds apace, there exists a growing need for even higher energy density in lithium-ion secondary batteries. However, the graphite making up the carbon material is limited to the theoretical lithium intercalation/deintercalation capacity of 372 mAh/g. Hence, a negative-electrode material having a larger lithium intercalation/deintercalation capacity is desired.

To address this need, methods of using silicon materials in place of carbon materials that have a low charge/discharge capacity are being investigated. However, silicon materials experience large changes in volume from charging and discharging, as a result of which the electrode material sometimes incurs damage when continuous charging and discharging is carried out. This has led to investigations also on carbon-silicon composite materials (e.g., see Patent Documents 1 to 4). However, even with such carbon-silicon composite materials, the problem of damage to the material due to volumetric changes in the silicon present therein has yet to be fully resolved.

PRIOR ART DOCUMENTS

Patent Documents

Patent Document 1: Japanese Kokai Publication 2004-259475 (JP-A 2004-259475)
Patent Document 2: Japanese Kokai Publication 2003-187798 (JP-A 2003-187798)
Patent Document 3: Japanese Kokai Publication 2001-160392 (JP-A 2001-160392)
Patent Document 4: Japanese Kokai Publication 2005-123175 (JP-A 2005-123175)

SUMMARY OF THE INVENTION

Problems to be Solved by the Invention

The object of the present invention is to provide a method of producing carbon particles for an electrode, the carbon particles being highly suitable for use as an electrode material, and being able to achieve a high charge/discharge efficiency and durability when used as a negative-electrode material in lithium-ion secondary batteries.

Means for Solving the Problems

The present invention provides a method of producing carbon particles for an electrode, each containing particles of a metal capable of forming an alloy with lithium, being formed by an aggregation of numerous fine particles composed of carbon, and having a hollow open-cell structure in which cells among the fine particles form a plurality of interconnected pores. The method includes the steps of mixing together a monomer having a low compatibility with a polymer to be formed, an organic solvent having a low compatibility with the polymer to be formed, and particles of a metal capable of forming an alloy with lithium, to prepare a monomer-containing mixture; dispersing the monomer-containing mixture in an aqueous phase to prepare a suspension containing, dispersed therein, oil droplets of the monomer-containing mixture; polymerizing the oil droplets in the suspension to prepare resin particles; and curing the resin particles.

The present invention is described in detail below.

The method of producing carbon particles for an electrode of the present invention includes the step of mixing together a monomer having a low compatibility with a polymer to be formed, an organic solvent having a low compatibility with a polymer to be formed, and particles of a metal capable of forming an alloy with lithium to prepare a monomer-containing mixture (below, "having a low compatibility with a polymer to be formed" is sometimes shortened to "having a low compatibility" and "particles of a metal capable of forming an alloy with lithium" is sometimes shortened to "metal particles").

In this specification, "having a low compatibility with a polymer to be formed" means that the solubility parameter (SP value) of the monomer or organic solvent and the solubility parameter (SP value) of the polymer have a difference therebetween of at least 1.5.

Also, in this specification, solubility parameter (SP value) refers to the value calculated by Fedors' formula.

The monomer having a low compatibility, through polymerization followed by curing, makes up a carbon component of the resulting carbon particles for an electrode. By using the monomer having a low compatibility together with the organic solvent having a low compatibility, the resulting carbon particles for an electrode form due to an aggregation of numerous fine particles composed of carbon, and have a hollow open-cell structure in which cells among the fine particles form a plurality of interconnected pores.

Examples of the monomer having a low compatibility include divinylbenzene, vinyl chloride and acrylonitrile.

The organic solvent having a low compatibility plays a role of a hollowing agent in the method of producing carbon particles for an electrode of the present invention.

A suitable organic solvent selected according to the monomer having a low compatibility is used as the organic solvent having a low compatibility. By way of illustration, when divinylbenzene is used as the monomer having a low compatibility, examples of the organic solvent having a low compatibility include linear hydrocarbons such as n-heptane and alicyclic hydrocarbons such as cyclohexane.

In the above monomer-containing mixture, the lower limit in the amount of the organic solvent having a low compatibility per 100 parts by weight of the monomer having a low compatibility is preferably 5 parts by weight, and the upper limit is preferably 75 parts by weight. If the amount of the organic solvent is less than 5 parts by weight, sufficient voids do not form at the interior of the resulting carbon particles for an electrode. Because of this, during continuous charging and discharging, volumetric changes in the metal capable of forming an alloy with lithium cannot be absorbed, as a result of which damage sometimes tends to arise in the carbon particles for the electrode. If the amount of the organic solvent is more than 75 parts by weight, the strength of the resulting carbon particles for an electrode may decrease or a particulate shape may become difficult to maintain. The lower limit in the amount of the organic solvent is more preferably 10 parts by weight, and the upper limit is more preferably 70 parts by weight.

Examples of the metal capable of forming an alloy with lithium which makes up the metal particles include silicon, tin, magnesium, titanium, vanadium, cadmium, selenium, iron, cobalt, nickel, manganese, platinum and boron. Of these, silicon and tin are preferred in that an especially high lithium intercalation/deintercalation capacity can be achieved. Silicon is more preferred.

The preferred upper limit in the average diameter of the metal particles is 1 μm. If the average diameter of the metal particles is more than 1 μm, the lithium intercalation/deintercalation capacity of the resulting carbon particles for an electrode may decrease.

It is preferable for the surface of the metal particles to be treated with a pigment dispersant. By having the surface treated with a pigment dispersant, the dispersibility of the particles in the monomer-containing mixture increases.

Examples of the pigment dispersant include amidoamine salts of high-molecular-weight polyester acids, acrylic polymers, aliphatic polycarboxylic acids, amine salts of polyesters, polyvinyl alcohols, polyvinyl pyrrolidone and methyl cellulose.

The pigment dispersant may be added to the monomer mixture together with the metal particles.

In the monomer-containing mixture, the lower limit in the amount of the metal particles per 100 parts by weight of the monomer having a low compatibility is preferably 1 part by weight. At an amount of the metal particles below 1 part by weight, the resulting carbon particles for an electrode may be unable to achieve a high lithium intercalation/deintercalation capacity. The lower limit in the amount of the metal particles is more preferably 5 parts by weight. There is no particular limitation on the upper limit in the amount of the metal particles. The higher the amount of the metal particles included, the higher the capability to obtain carbon particles for an electrode which are able to achieve a high lithium intercalation/deintercalation capacity. However, if the amount of the metal particles is too high, the resulting carbon particles for an electrode may have an inadequate electrical conductivity. The upper limit in the amount of the metal particles is preferably 95 parts by weight.

The above monomer-containing mixture includes a polymerization initiator.

Polymerization initiators that may be used include hitherto known polymerization initiators, such as organic peroxides, azo compounds, metal ion redox initiators, photopolymerization initiators and persulfates.

The polymerization initiator should be included in the necessary amount within the monomer-containing mixture. If too little polymerization initiator is included, the monomer may not sufficiently polymerize to cause failure of particle formation. If too much polymerization initiator is included, the molecular weight may not increase and difficulties may arise in the post-treatment of the resulting carbon particles for an electrode.

The monomer-containing mixture may optionally include other additives. For example, at least one electrically conductive additive selected from the group consisting of graphite, carbon black, carbon nanotube, graphene and fullerene may also be included. By including such an electrically conductive additive, the electrical conductivity of the resulting carbon particles for an electrode can be further increased. Of the foregoing electrically conductive additives, when the monomer-containing mixture contains graphite in particular, in addition to its role as an electrically conductive additive, the graphite also can be expected to provide a discharge capacity-increasing effect.

Preparation of the monomer-containing mixture is exemplified by a method which involves mixing together and ultrasonically dispersing the above monomer having a low compatibility, the above organic solvent having a low compatibility, the above metal particles and, optionally, an additive.

The method of producing carbon particles for an electrode of the present invention includes the step of dispersing the monomer-containing mixture in an aqueous phase to prepare a suspension containing, dispersed therein, oil droplets of the monomer-containing mixture.

The aqueous medium making up the aqueous phase is exemplified by water, alcohols and ketones.

The aqueous medium preferably includes a dispersant such as polyvinyl alcohol, methyl cellulose, polyvinyl pyrrolidone, insoluble inorganic particles or a high-molecular-weight surfactant.

Preparation of the suspension is exemplified by a method which involves adding the monomer-containing mixture to the aqueous medium and agitating with an agitating apparatus such as a homogenizer, a static mixer, an ultrasonic mixer, an ultrasonic homogenizer, a Shirasu porous glass membrane, or stirring blades.

The particle diameter of the resulting carbon particles for an electrode may be adjusted by regulating the above agitating conditions so as to control the size of the oil droplets of the monomer-containing mixture in the suspension.

The method of producing the carbon particles for an electrode of the present invention includes the step of polymerizing the oil droplets in the suspension to prepare resin particles.

The polymerization conditions when polymerizing the oil droplets to prepare resin particles are exemplified by a method which involves agitating the suspension under a stream of nitrogen gas at from 30 to 95° C. for a period of from about 1 to about 50 hours.

The resulting resin particles are separated from the suspension, subjected to such operations as rinsing with water, drying and classification, then furnished to subsequent steps.

The method of producing the carbon particles for an electrode of the present invention includes the step of curing the resin particles.

The curing conditions may be suitably selected according to the resin particles. Cases in which the curing temperature is 1,000° C. or lower, from 1,000 to 2,500° C., and 2,500° C. or higher are conceivable.

When the curing temperature is set to 1,000° C. or lower, if the resulting carbon particles for an electrode are used in a negative-electrode material for a lithium-ion secondary battery, a very high lithium intercalation/deintercalation capacity can be achieved, enabling a high output to be obtained. However, the output of the lithium-ion secondary battery may be unstable.

When the curing temperature is set to from 1,000 to 2,500° C., if the resulting carbon particles for an electrode are used in a negative-electrode material for a lithium-ion secondary battery, stable power characteristics and a stable cycle life can be achieved. However, the lithium intercalation/deintercalation capacity becomes lower, as a result of which a lithium-ion secondary battery having a high output may not be obtained.

When the curing temperature is set to 2,500° C. or higher, if the resulting carbon particles for an electrode are used in a negative-electrode material for a lithium-ion secondary battery, a very high lithium intercalation/deintercalation capacity can be achieved and a high output can be obtained.

The carbon particles for an electrode produced by the method of the present invention have a high lithium intercalation/deintercalation capacity compared with conventional carbon particles composed solely of carbon, and have an excellent performance in that they do not damage easily even when continuous charging and discharging is carried out.

The structure of the carbon particles for an electrode produced by the method of the present invention was closely investigated, as a result of which it was found that the carbon particles each contain particles of a metal capable of forming an alloy with lithium, are formed by an aggregation of numerous fine particles composed of carbon, and have a hollow open-cell structure in which cells among the fine particles form a plurality of interconnected pores. FIG. 1 schematically shows this hollow open-cell structure.

The carbon particles 1 for an electrode produced by the method of the present invention are each formed by an aggregation of numerous fine particles 11 composed of carbon, and cells among the fine particles 11 form a plurality of interconnected pores 12. Particles 13 of a metal capable of forming an alloy with lithium are contained inside the plurality of interconnected pores 12 so as to come into contact with the fine particles 11 composed of carbon.

It is thought that, by having such a hollow open-cell structure, the carbon particles for an electrode produced by the method of the present invention are capable of exhibiting a high lithium intercalation/deintercalation capacity because they contain particles of a metal capable of forming an alloy with lithium, and are also capable of exhibiting an excellent performance in that they do not easily damage even when continuous charging and discharging is carried out. Even in the carbon particles for an electrode produced by the method of the present invention, carrying out continuous charging and discharging will give rise to volumetric changes in the particles of a metal capable of forming an alloy with lithium. However, by having a hollow open-cell structure, it is presumed that stress due to such volumetric changes can be dispersed and absorbed, so that damage is not incurred.

In another aspect, the present invention also provides carbon particles for an electrode which contain particles of a metal capable of forming an alloy with lithium, are formed by an aggregation of numerous fine particles composed of carbon, and have a hollow open-cell structure in which cells among the fine particles form a plurality of interconnected pores.

The carbon particles for an electrode of the present invention have an average particle diameter with a lower limit of 10 nm and an upper limit of 1 mm. At an average particle diameter of below 10 nm, cohesion sometimes arise during curing when the carbon particles for an electrode of the present invention are produced, which can make it difficult to produce individual particles. At an average particle diameter greater than 1 mm, when molding of the electrode material is carried out, molding in the desired shape or size may not be possible. The average particle diameter has a preferred lower limit of 1,000 nm and a preferred upper limit of 500 µm.

In the carbon particles for an electrode of the present invention, the lower limit in the content of the particles of a metal capable of forming an alloy with lithium is preferably 1% by weight. At a content of the metal particles of less than 1% by weight, a high lithium intercalation/deintercalation capacity may not be achievable. The lower limit in the content of the metal particles is more preferably 5% by weight.

On the other hand, the larger the amount of the metal particles included, the higher the lithium intercalation/deintercalation capacity that can be achieved. If the content of the metal particles is too high, the carbon particles for an electrode may be unable to absorb volumetric changes in the metal particles during continuous charging and discharging, and may therefore damage more easily. The upper limit in the content of the metal particles is preferably 95% by weight.

The lower limit in the porosity of the carbon particles for an electrode of the present invention is preferably 5% and the upper limit is preferably 95%. At a porosity below 5%, volumetric changes during continuous charging and discharging in the particles of a metal capable of forming an alloy with lithium cannot be absorbed sufficiently, as a result of which the carbon particles for an electrode may damage more easily. At a porosity greater than 95%, the resulting carbon material, etc. may have a lower strength or the amount of carbon may decrease, resulting in a lower electrical conductivity.

The above porosity can be determined by Archimedes' principle from the specific gravity measured with, for example, a pycnometric apparatus for measuring true density.

Because the carbon particles for an electrode of the present invention have a high lithium intercalation/deintercalation capacity, and moreover are resistant to damage even when continuous charging and discharging is carried out, these carbon particles can be advantageously used in an electrode material, particularly a negative-electrode material for lithium-ion secondary batteries. The carbon particles for an electrode of the present invention may also be advantageously used in electrode materials for electrical double-layer capacitors and in electrode materials for capacitors.

In yet another aspect, the present invention also provides a negative-electrode material for a lithium-ion secondary battery, including the carbon particles for an electrode of the present invention and a binder resin.

The binder resin serves as a binder for bonding together the carbon particles for an electrode of the present invention, thereby enabling the carbon particles to be molded into a desired shape. However, when a large amount of the binder resin is added, the electrical conductivity of the resulting negative-electrode material for a lithium-ion secondary battery may decline.

Examples of the binder resin include polyvinylidene fluoride and styrene-butadiene rubber.

The negative-electrode material for a lithium-ion secondary battery of the present invention preferably further includes at least one electrically conductive additive selected from the group consisting of graphite, carbon black, carbon nanotube, graphene and fullerene. By including such an electrically conductive additive, the electrical conductivity of the negative-electrode material for a lithium-ion secondary battery of the present invention is further increased.

The lower limit in the content of the electrically conductive additive is preferably 1% by weight and the upper limit is preferably 90% by weight. If the content of the electrically conductive additive is less than 1% by weight, a sufficient conductivity-enhancing effect may not be achieved. If the content of the electrically conductive additive is more than 90% by weight, the lithium intercalation capacity may decrease.

When the above electrically conductive additive is included in at least a given amount, it may also play a role of a binder which binds together the carbon particles for an electrode. In cases where the electrically conductive additive plays a role of a binder, the content of the binder resin may be lowered, enabling a higher electrical conductivity to be achieved.

The negative-electrode material for a lithium ion secondary battery of the present invention may be produced by a method which involves, for example, mixing together the carbon particles for an electrode of the present invention, the electrically conductive additive and the binder resin to form a mixture, then molding the mixture.

The above mixture may also include an organic solvent so as to facilitate molding.

The organic solvent should be a solvent which is capable of dissolving the binder resin, examples of which include N-methylpyrrolidone and N,N-dimethylformamide.

Effects of the Invention

The present invention provides a method of producing carbon particles for an electrode, the carbon particles being highly suitable for use as an electrode material, and being able to achieve a high charge/discharge efficiency and durability when used as a negative-electrode material in lithium-ion secondary batteries.

MODES FOR CARRYING OUT THE INVENTION

Figure 1:
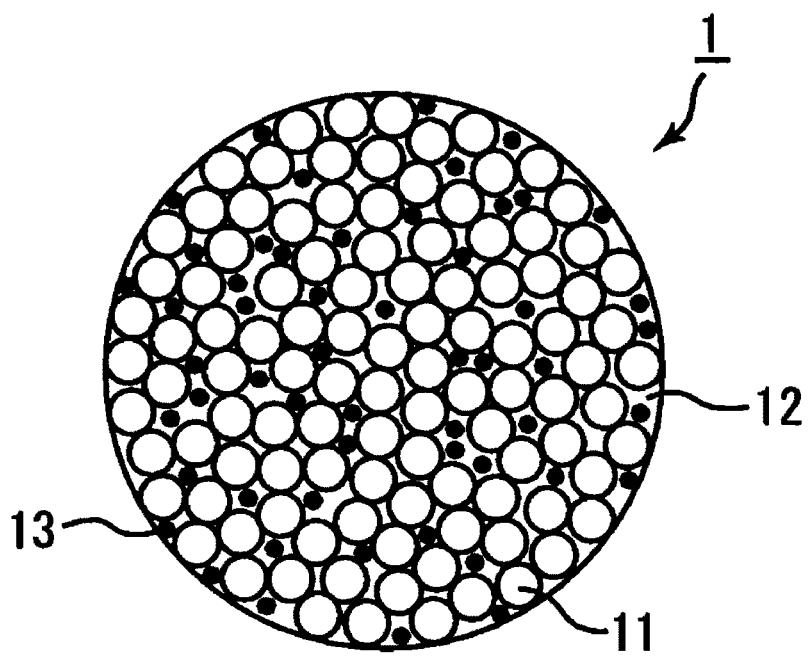
FIG. 1 is a schematic view illustrating the structure of the carbon particles for an electrode of the present invention.

The embodiments of the present invention are described below in greater detail by way of examples, although the present invention is not limited by these examples.

EXAMPLE 1

(1) Preparation of Carbon Particles for Electrode

An oil-phase component was prepared by mixing together and ultrasonically dispersing 100 parts by weight of divinylbenzene as a monomer, 100 parts by weight of n-heptane as a hollowing agent, 5 parts by weight of silicon particles (silicon nanopowder available from Aldrich Chemical Co.) as metal particles and 5 parts by weight of a pigment dispersant (DA-7301, available from Kusumoto Chemicals, Ltd.), following which an organic peroxide was added thereto as a polymerization initiator so as to give a monomer mixture. In a separate procedure, an aqueous-phase component was prepared by mixing together 500 parts by weight of pure water and 5 parts by weight of polyvinyl alcohol as a dispersant.

The resulting oil-phase component and aqueous-phase component were mixed together, then dispersed by agitation in a homogenizer so as to prepare a suspension. The resulting suspension was stirred, held and polymerized under a stream of nitrogen at 80° C. for 12 hours. The particles obtained by polymerization were washed, classified according to the particle diameter, then dried, giving resin particles.

The resulting resin particles were heat-treated in an open-air atmosphere at 300° C. for 3 hours, then cured in a nitrogen atmosphere at 1,000° C. for 3 hours, thereby giving carbon particles for an electrode.

The resulting carbon particles for an electrode had an average particle diameter of 20 μm, and the coefficient of variation (Cv) in the particle diameter was 5%. The average particle diameter and the Cv value was determined by examining about 100 randomly selected particles using an electron microscope (S-4300 SE/N, manufactured by Hitachi High-Technologies Corporation).

(2) Production of Negative-Electrode Material for Lithium-Ion Secondary Battery

A liquid mixture was prepared by mixing 100 parts by weight of the resulting carbon particles for an electrode, 10 parts by weight of carbon black (#3230B, available from Mitsubishi Chemical Corporation) as an electrically conductive additive, 10 parts by weight of polyvinylidene fluoride as a binder resin, and N-methylpyrrolidone as an organic solvent.

The resulting liquid mixture was coated on one side of copper foil having a thickness of 18 μm and dried, then pressure-molded with a press roll to form a negative-electrode sheet. The resulting negative-electrode sheet was punched into 14 mm diameter disks, thereby producing a negative-electrode material for a lithium-ion secondary battery.

EXAMPLES 2 to 14

Aside from varying the type and amount of the oil-phase component from among the "particle polymerization composition," aside from varying the treatment conditions of the polymerized particles and aside from varying the type and amount of the electrically conductive additive and the amount of the binder resin from among the "negative-electrode material composition" as shown in Table 1, particles for an electrode and negative-electrode materials for a lithium-ion secondary battery were obtained in the same way as in Example 1. The carbon nanotube used was multilayer carbon nanotube produced by Showa Denko K.K. The graphite used was SNO-3 produced by SEC Carbon, Ltd.

Figure 2:
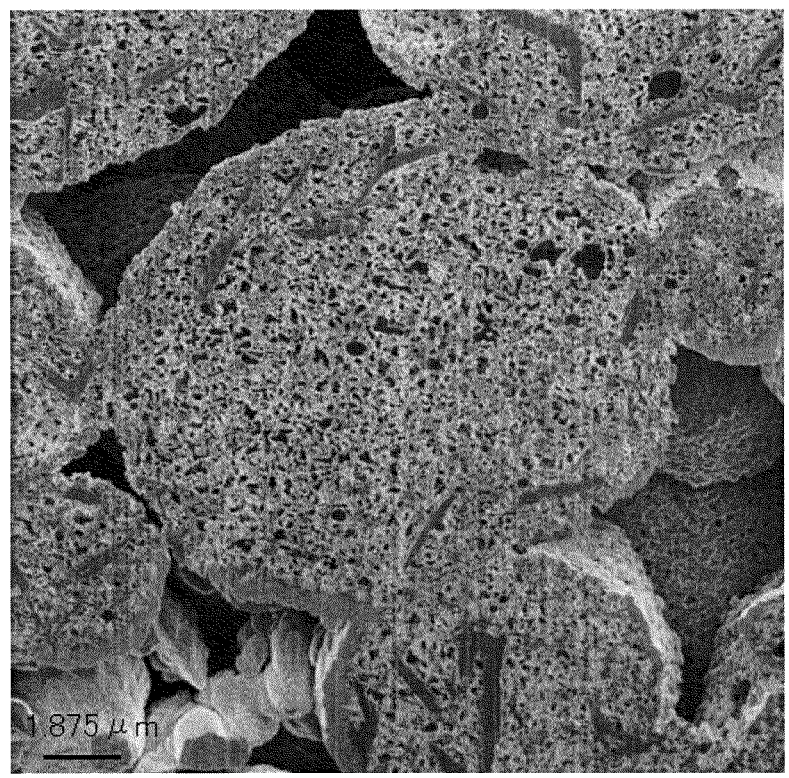
FIG. 2 is an electron micrograph of a cross-section of the carbon particles for an electrode produced in Example 14.
Figure 3:
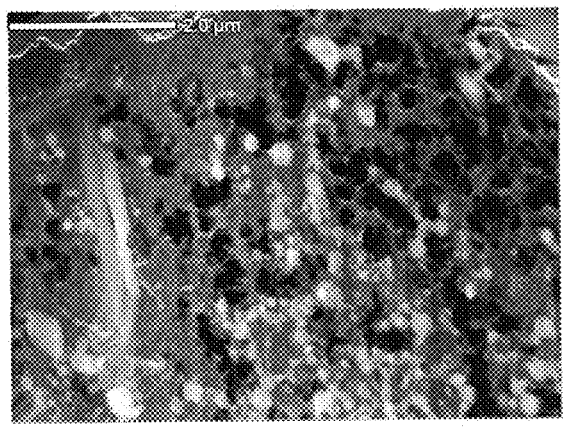
FIG. 3 provides an electron micrograph of a cross-section of the carbon particles for an electrode produced in Example 14 (FIG. 3(a)), and EDS (Energy Dispersive X-Ray Spectrometer) element map images of the carbon particles produced in the same example (FIG. 3(b) being a carbon element image, and FIG. 3(c) being a silicon element image).
Figure 3:
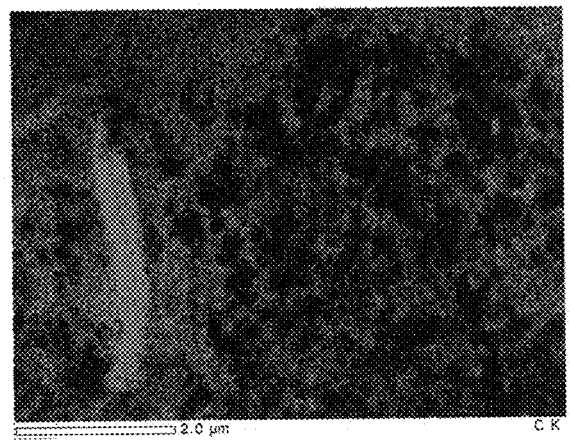
Figure 3:

FIG. 2 shows an electron micrograph (×20,000) of a cross-section of the carbon particles for an electrode that were produced in Example 14. FIG. 3 shows an electron micrograph of a cross-section of the carbon particles for an electrode that were produced in Example 14 (×100,000; FIG. 3(a)), and also shows EDS (Energy Dispersive X-Ray Spectrometer) element map images of the same (×100,000; FIG. 3(b) being a carbon element image, and FIG. 3(c) being a silicon element image).

COMPARATIVE EXAMPLE 1

Aside from using graphite particles (available from Wako Pure Chemical Industries, Ltd.; average diameter, 20 μm; Cv value in particle diameter, 50%) as the particles for the negative-electrode material, a negative-electrode material for a lithium-ion secondary battery was obtained in the same way as in Example 1.

COMPARATIVE EXAMPLE 2

Aside from using activated carbon particles (available from Norit Japan Co. Ltd.; Norit SX Plus; average diameter, 160 μm; Cv value in particle diameter, 120%) as the particles for the negative-electrode material, a negative-electrode material for a lithium-ion secondary battery was obtained in the same way as in Example 1.

COMPARATIVE EXAMPLE 3

Aside from using a silicon powder (silicon nanopowder, available from Aldrich Chemical Co.) as the particles for the negative-electrode material, a negative-electrode material for a lithium-ion secondary battery was obtained in the same way as in Example 1.

COMPARATIVE EXAMPLES 4 to 7

Aside from changing the particle polymerization composition, the treatment conditions of the polymerized particles and the negative-electrode material composition as shown in Table 1, particles for an electrode and a negative-electrode material for a lithium-ion secondary battery were obtained in the same way as in Example 1.

(Evaluation)

The negative-electrode materials for a lithium-ion secondary battery obtained in the examples and the comparative examples were evaluated as described below.

The results are shown in Tables 1, 2 and 3.

In Comparative Example 3, evaluations were attempted, but measurements could not be carried out.

(1) Production of Lithium-Ion Secondary Battery

Coin-type model cells were fabricated using the negative-electrode materials for a lithium-ion secondary battery obtained in the examples and the comparative examples.

Specifically, the negative-electrode material for a lithium-ion secondary battery and a 16 mm diameter counter electrode (lithium metal) were placed one over the other with a separator therebetween. The separator was impregnated with an electrolysis solution, and the resulting assembly was crimped through gaskets between a top casing and a bottom casing. The negative-electrode and the counter-electrode lithium were disposed so that contact and electrical connection with the top casing and bottom casing, respectively, are established.

A polyethylene porous film having a thickness of 25 μm and a diameter of 24 mm was used as the separator, and a solution obtained by dissolving $LiPF_6$ as an electrolyte to a concentration of 1 mol/L in a mixed solvent of ethylene carbonate and dimethyl carbonate (volumetric ratio, 1:2) was used as the electrolysis solution.

(2) Discharge Capacity, Charge/Discharge Efficiency

The charging and discharging conditions were follows. Following 4 hours at rest at 0 voltage and current, the voltage fell to 0.002 V at a current corresponding to 1 C, after which the battery was held at this current level for 3 hours and charged. The battery was left at rest for 10 minutes, then discharged to a voltage of 3 V at a current of 0.2 C. After 10 minutes of rest, this charge/discharge cycle was repeated. The charge/discharge capacity was determined from the amount of current that passed through during this time.

In addition, the initial charge/discharge efficiency (%) and the charge/discharge efficiency (%) in the second cycle were calculated. In this test, the process of lithium intercalation to the negative-electrode material was treated as charging, and the process of deintercalation was treated as discharging.

Initial charge/discharge efficiency (%)=(discharge capacity of first cycle/charge capacity of first cycle)×100

Second cycle charge/discharge efficiency (%)=(discharge capacity of second cycle/charge capacity of second cycle)×100

(3) Cycle Characteristics

The above cycle was repeated ten times, and the cycle characteristics were calculated using the following formula.

Capacity retention from start to 10th cycle (%)=(discharge capacity of 10th cycle/discharge capacity of first cycle)×100

Capacity retention from 2nd cycle to 10th cycle (%)=(discharge capacity of 10th cycle/discharge capacity of 2nd cycle)×100

TABLE 1

| | | | | Examples | | | | | | |
|---|---|---|---|---|---|---|---|---|---|---|
| | | | | 1 | 2 | 3 | 4 | 5 | 6 | 7 |
| Particle polymerization composition (parts by weight) | Oil phase (monomer-containing mixture) | Monomer | Divinyl benzene | 100 | 100 | 100 | 100 | 50 | 100 | 100 |
| | | | Acrylonitrile | — | — | — | — | 50 | — | — |
| | | | Styrene | — | — | — | — | — | — | — |
| | | Hollowing agent | Heptane | 100 | 100 | 100 | 100 | — | 100 | 100 |
| | | | Toluene | — | — | — | — | 100 | — | — |
| | | Metal particles | Silicon | 5 | 10 | 10 | 20 | 5 | 10 | 20 |
| | | Dispersant | DA7301 | 5 | 10 | 10 | 20 | 5 | 10 | 20 |
| | | Electrically Conductive additive | Carbon nanotube | — | — | — | 5 | — | — | — |
| | | | Graphite | — | — | — | — | — | — | — |
| | Aqueous phase | Medium | Water | 500 | 500 | 500 | 500 | 500 | 500 | 500 |
| | | Dispersant | PVA | 5 | 5 | 5 | 5 | 5 | 5 | 5 |

TABLE 1-continued

|  |  |  | Examples | | | | | | |
| --- | --- | --- | --- | --- | --- | --- | --- | --- | --- |
|  |  |  | 1 | 2 | 3 | 4 | 5 | 6 | 7 |
| Treatment conditions of polymer particles | | Classification | Yes | Yes | Yes | Yes | Yes | No | No |
| | | Curing temperature (° C.) | 1000 | 1000 | 1000 | 1000 | 1000 | 1000 | 1000 |
| Particle properties | | Particle structure | Hollow open-cell | Hollow open-cell | Hollow open-cell | Hollow open-cell | Hollow open-cell | Hollow open-cell | Hollow open-cell |
| | | Particle diameter (μm) | 20 | 20 | 20 | 20 | 10 | 20 | 20 |
| | | Cv value (%) | 5 | 5 | 5 | 5 | 5 | 40 | 40 |
| Negative-electrode material composition | Particles | Particles for electrode | 100 | 100 | 100 | 100 | 100 | 100 | 100 |
| | | Graphite | — | — | — | — | — | — | — |
| | | Activated carbon | — | — | — | — | — | — | — |
| | | Silicon | — | — | — | — | — | — | — |
| | Electrically Conductive additive | Carbon black | 10 | — | — | — | 10 | 10 | 10 |
| | | Carbon nanotube | — | 10 | 100 | 10 | — | — | — |
| | Binder | Polyvinylidene fluoride | 10 | 10 | — | 10 | 10 | 10 | 10 |
| Evaluations | | Initial discharge capacity (mAh/g) | 670 | 1020 | 900 | 1710 | 680 | 1000 | 1700 |
| | | Initial charge/discharge efficiency (%) | 63 | 66 | 67 | 71 | 64 | 70 | 70 |
| | | Second cycle discharge capacity (mAh/g) | 665 | 1015 | 895 | 1700 | 675 | 990 | 1670 |
| | | Second cycle charge/discharge efficiency (%) | 91 | 92 | 93 | 93 | 92 | 90 | 90 |
| | | Capacity retention from start to 10th cycle(%) | 99 | 96 | 98 | 92 | 92 | 95 | 93 |
| | | Capacity retention from 2nd cycle to 10th cycle (%) | 99 | 97 | 98 | 96 | 96 | 97 | 97 |

TABLE 2

|  |  |  |  | Examples | | | | | | |
| --- | --- | --- | --- | --- | --- | --- | --- | --- | --- | --- |
|  |  |  |  | 8 | 9 | 10 | 11 | 12 | 13 | 14 |
| Particle polymerization composition (parts by weight) | Oil phase (monomer-containing mixture) | Monomer | Divinyl benzene | 100 | 100 | 100 | 100 | 50 | 100 | 100 |
| | | | Acrylonitrile | — | — | — | — | 50 | — | — |
| | | | Styrene | — | — | — | — | — | — | — |
| | | Hollowing agent | Heptane | 100 | 100 | 100 | 100 | — | 100 | 100 |
| | | | Toluene | — | — | — | — | 100 | — | — |
| | | Metal particles | Silicon | 5 | 10 | 10 | 20 | 10 | 10 | 20 |
| | | Dispersant | DA7301 | 5 | 10 | 10 | 20 | 10 | 10 | 20 |
| | | Electrically Conductive additive | Carbon nanotube | — | — | — | — | — | — | — |
| | | | Graphite | 10 | 10 | 10 | 20 | 10 | 20 | 20 |
| | Aqueous phase | Medium | Water | 500 | 500 | 500 | 500 | 500 | 500 | 500 |
| | | Dispersant | PVA | 5 | 5 | 5 | 5 | 5 | 5 | 5 |
| Treatment conditions of polymer particles | | Classification | | Yes | Yes | Yes | Yes | Yes | No | No |
| | | Curing temperature (° C.) | | 1000 | 1000 | 1000 | 1000 | 1000 | 1000 | 1000 |
| Particle properties | | Particle structure | | Hollow open-cell | Hollow open-cell | Hollow open-cell | Hollow open-cell | Hollow open-cell | Hollow open-cell | Hollow open-cell |
| | | Particle diameter (μm) | | 20 | 20 | 20 | 20 | 10 | 20 | 20 |
| | | Cv value (%) | | 5 | 5 | 5 | 5 | 5 | 40 | 40 |
| Negative-electrode material composition | Particles | Particles for electrode | | 100 | 100 | 100 | 100 | 100 | 100 | 100 |
| | | Graphite | | — | — | — | — | — | — | — |
| | | Activated carbon | | — | — | — | — | — | — | — |
| | | Silicon | | — | — | — | — | — | — | — |
| | Electrically Conductive additive | Carbon black | | 10 | 10 | — | 10 | 10 | 10 | 10 |
| | | Carbon nanotube | | — | — | 100 | — | — | — | — |
| | Binder | Polyvinylidene fluoride | | 10 | 10 | — | 10 | 10 | 10 | 10 |
| Evaluations | | Initial discharge capacity (mAh/g) | | 680 | 1030 | 910 | 1730 | 1060 | 1000 | 1700 |

TABLE 2-continued

|  | | Examples | | | | | | |
|---|---|---|---|---|---|---|---|---|
|  | | 8 | 9 | 10 | 11 | 12 | 13 | 14 |
| Initial charge/discharge efficiency (%) | | 65 | 67 | 70 | 72 | 68 | 70 | 70 |
| Second cycle discharge capacity (mAh/g) | | 670 | 1020 | 900 | 1720 | 1050 | 990 | 1690 |
| Second cycle charge/discharge efficiency (%) | | 92 | 94 | 95 | 97 | 96 | 95 | 95 |
| Capacity retention from start to 10th cycle(%) | | 98 | 97 | 97 | 95 | 95 | 95 | 95 |
| Capacity retention from 2nd cycle to 10th cycle (%) | | 99 | 98 | 99 | 97 | 97 | 98 | 98 |

TABLE 3

|  |  |  |  | Comparative Examples | | | | | | |
|---|---|---|---|---|---|---|---|---|---|---|
|  |  |  |  | 1 | 2 | 3 | 4 | 5 | 6 | 7 |
| Particle polymerization composition (parts by weight) | Oil phase (monomer-containing mixture) | Monomer | Divinyl benzene |  |  |  | 100 | 50 | 50 | 100 |
|  |  |  | Acrylonitrile |  |  |  | — | — | — | — |
|  |  |  | Styrene |  |  |  | — | 50 | 50 | — |
|  |  | Hollowing agent | Heptane |  |  |  | 100 | — | — | — |
|  |  |  | Toluene |  |  |  | — | — | — | — |
|  |  | Metal particles | Silicon |  |  |  | — | — | — | 10 |
|  |  | Dispersant | DA7301 |  |  |  | — | — | — | 10 |
|  |  | Electrically Conductive additive | Carbon nanotube |  |  |  | — | — | — | — |
|  |  |  | Graphite |  |  |  | — | — | — | — |
|  | Aqueous phase | Medium | Water |  |  |  | 500 | 500 | 500 | 500 |
|  |  | Dispersant | PVA |  |  |  | 5 | 5 | 5 | 5 |
| Treatment conditions of polymer particles | | | Classification |  |  |  | Yes | No | No | Yes |
|  | | | Curing temperature (° C.) |  |  |  | 1000 | 800 | 2000 | 1000 |
| Particle properties | | | Particle structure |  |  |  | Hollow open-cell | Solid | Solid | Solid |
|  | | | Particle diameter (μm) |  |  |  | 20 | 20 | 20 | 20 |
|  | | | Cv value (%) |  |  |  | 5 | 40 | 40 | 5 |
| Negative-electrode material composition | Particles | Particles for electrode |  | — | — | — | 100 | 100 | 100 | 100 |
|  |  | Graphite |  | 100 | — | — | — | — | — | — |
|  |  | Activated carbon |  | — | 100 | — | — | — | — | — |
|  |  | Silicon |  | — | — | 100 | — | — | — | — |
|  | Electrically Conductive additive | Carbon black |  | 10 | 10 | 10 | 10 | 10 | 10 | — |
|  |  | Carbon nanotube |  | — | — | — | — | — | — | 10 |
|  | Binder | Polyvinylidene fluoride |  | 10 | 10 | 10 | 10 | 10 | 10 | 10 |
| Evaluations | | Initial discharge capacity (mAh/g) |  | 300 | 220 | — | 280 | 270 | 300 | 990 |
|  | | Initial charge/discharge efficiency (%) |  | 71 | 70 | — | 70 | 70 | 70 | 70 |
|  | | Second cycle discharge capacity (mAh/g) |  | 300 | 215 | — | 275 | 265 | 295 | 980 |
|  | | Second cycle charge/discharge efficiency (%) |  | 96 | 94 | — | 94 | 93 | 93 | 93 |
|  | | Capacity retention from start to 10th cycle(%) |  | 90 | 85 | — | 85 | 60 | 61 | 42 |
|  | | Capacity retention from 2nd cycle to 10th cycle (%) |  | 90 | 86 | — | 86 | 62 | 63 | 50 |

INDUSTRIAL APPLICABILITY

The present invention is able to provide a method of producing carbon particles for an electrode, the carbon particles being highly suitable for use as an electrode material, and being able to achieve a high charge/discharge efficiency and durability when used as a negative-electrode material in lithium-ion secondary batteries.

EXPLANATION OF SYMBOLS

1 Carbon particles for an electrode of the present invention
11 Fine particles composed of carbon
12 Plurality of interconnected pores
13 Metal capable of forming an alloy with lithium

The invention claimed is:

1. A method of producing carbon particles for an electrode, each containing particles of a metal capable of forming an alloy with lithium, being formed by an aggregation of numerous fine particles composed of carbon, and having a hollow open-cell structure in which cells among the fine particles form a plurality of interconnected pores, which comprises the steps of:

mixing together a monomer having a low compatibility with a polymer to be formed, an organic solvent having a low compatibility with the polymer to be formed, and particles of a metal capable of forming an alloy with lithium, to prepare a monomer-containing mixture;

dispersing the monomer-containing mixture in an aqueous phase to prepare a suspension containing, dispersed therein, oil droplets of the monomer-containing mixture;

polymerizing the oil droplets in the suspension to prepare resin particles; and curing the resin particles.

2. The method of producing carbon particles for an electrode according to claim 1, wherein the particles of a metal capable of forming an alloy with lithium are composed of silicon.

3. The method of producing carbon particles for an electrode according to claim 1, wherein the monomer-containing mixture further comprises at least one electrically conductive additive selected from the group consisting of graphite, carbon black, carbon nanotube, graphene and fullerene.

* * * * *